March 5, 1968 K. H. DORMER ET AL 3,372,284

VOLTAGE-MULTIPLYING DRIVE CIRCUIT FOR MAGNETIC CORE DEVICE

Filed Aug. 20, 1964

INVENTOR.

KEITH HENRY DORMER
BY CHARLES THOMAS WYRICK

United States Patent Office 3,372,284
Patented Mar. 5, 1968

3,372,284

VOLTAGE-MULTIPLYING DRIVE CIRCUIT FOR MAGNETIC CORE DEVICE

Keith Henry Dormer, Harrisburg, and Charles Thomas Wyrick, Camp Hill, Pa., assignors to AMP Incorporated, Harrisburg, Pa.

Filed Aug. 20, 1964, Ser. No. 390,980
16 Claims. (Cl. 307—88)

This invention relates to a voltage-multiplying drive circuit for a shift register and the like.

An object of this invention is to provide a drive circuit for operating magnetic core devices, such as, shift registers, which drive circuit provides effective voltage multiplying for generating sufficient advance voltage to operate a shift register of large bit content at a given supply voltage.

Another object of this invention is to provide a drive circuit which is very reliable, is easy to control and is relatively simple and inexpensive.

A more specific object of the present invention is to provide a drive circuit for energizing, at high speed and over a wide temperature range, a magnetic core shift register using multi-aperture cores.

In a multi-aperture (MAD) core shift register, such as shown in U.S. Patent No. 2,995,731, transfer of information from one core in the register to the next is accomplished by driving the one core with a properly-shaped "advance" current which returns the core to "clear" condition and simultaneously causes the transfer of the information stored in this core to the next core. Thereafter, the latter core is "cleared" by a second advance current, and so on. Between the advance currents applied to the cores, there is also applied a "prime" current which, as understood, conditions each given core in the register so that thereafter, upon the occurrence of an advance current, information can be transferred to the next core. The construction and operation of such a shift register is explained in detail in the above-mentioned patent.

Now, one of the problems with a shift register of this kind is the difficulty of providing the proper advance voltage with normal variations in source voltage. This problem becomes particularly difficult with regard to a shift register of large bit content. The present invention provides an improved supply unit particularly suitable for a magnetic core device, which can be operated at high speed, yet it uses only solid state devices, and it is extremely reliable in operation.

Heretofore, the charging and discharging of a single capacitor through a pulse-forming network provided distinct output pulses to supply prime current and advance current to the windings of a shift register device from a single source of supply. The circuit of this prior approach has proven highly successful in that it is less expensive and more reliable than prior known circuits of the same capability. However, one drawback of this circuit arrangement has been that the permissible voltage source for providing advance voltage has not proven adequate when the shift register is of large bit content which has resulted in distortion of the advance voltage waveform thereby reducing the operating range of the shift register, and, with increased distortion of this waveform, loss of operation would occur.

In accordance with the present invention, in one specific embodiment thereof, capacitor means is arranged to be charged from a source of supply. Thereafter, the charge which has accumulated in the capacitor means is discharged on command through a four-layer diode switch or the like through an advance winding of the shift register, and after being recharged is then discharged on command through another similar four-layer diode switch or the like through another advance winding of the shift register to provide proper sequencing to the prime and advance circuits. Between the capacitor and advance windings, there is provided a voltage-multiplying circuit arrangement in order to provide sufficient advance voltage especially when the shift register is of large bit content. The cores of the register between the advance currents are supplied with a pulse prime current which does not interfere with the advance currents and which nonetheless provides the necessary priming current. This cycle of charging and recharging of the capacitor means through the voltage-multiplying circuit to provide the prime and advance currents can be carried out at high speed with a high degree of proper sequence, failsafe operation and a higher permissible voltage source for providing sufficient advance voltage with a relatively low supply voltage.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration and principles thereof and the manner of applying it in practical use so that they may modify it in various forms, each as may be best suited to the conditions of a particular use.

Figure 1:
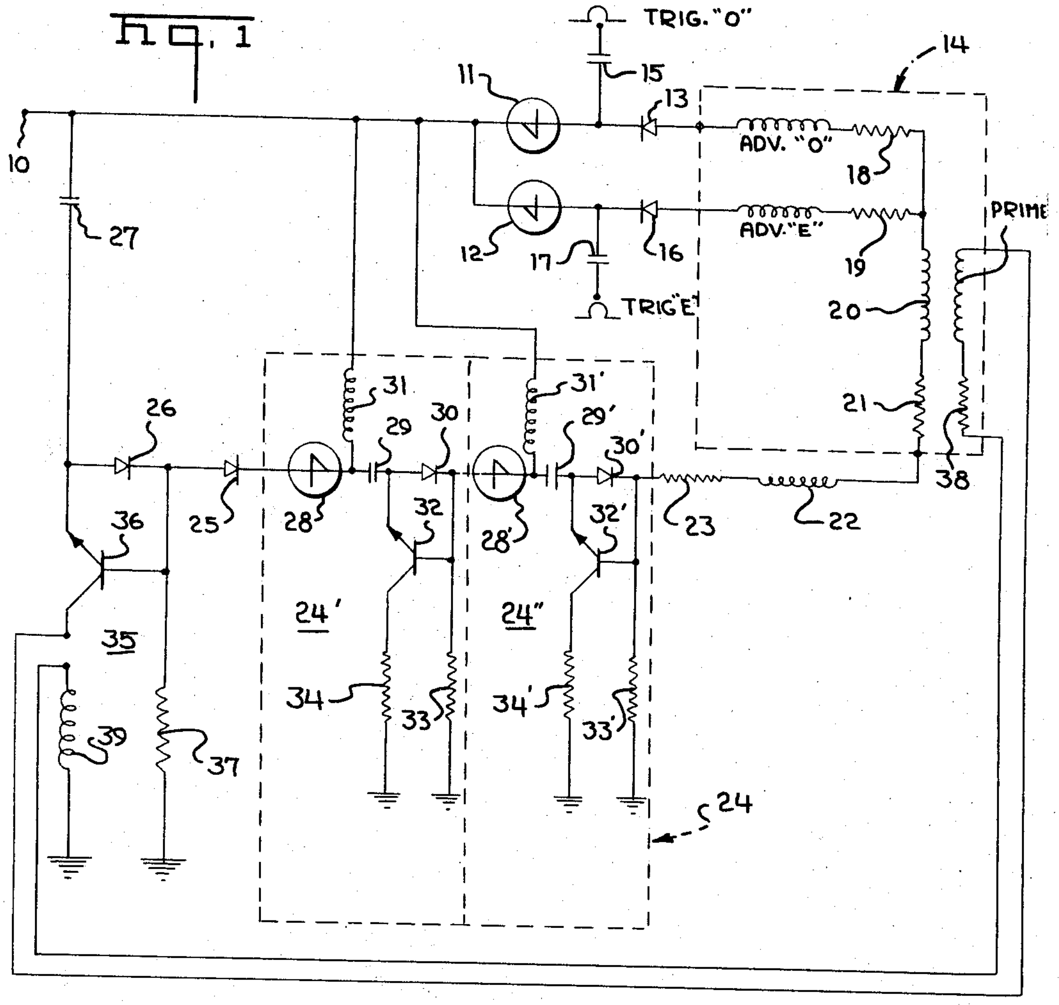
FIGURE 1 is a schematic diagram of the circuit of the invention.

Turning now to FIGURE 1, a suitable source of substantially constant voltage is denoted at 10 which may be a battery or some similar DC voltage. Supply 10 is connected to four-layer diodes 11 and 12 acting as solid state switches $SW_I$ and $SW_{II}$ respectively. Four-layer diode 11 is serially connected to diode 13 and an advance winding ADV "O" of shift register 14 which is preferably of large bit content. A positive voltage pulse TRIG "O" from a conventional trigger circuit (not shown) is applied to a capacitor 15 which, in turn, is connected to the junction of four-layer diode 11 and diode 13.

Similarly, four-layer diode 12 is serially connected to diode 16 and advance winding ADV "E" of shift register 14 while a positive voltage pulse TRIG "E" from the trigger circuit is applied to the junction of four-layer diode 12 and diode 16 via capacitor 17.

Each ADV "O" and ADV "E" winding is serially connected to a respective resistor 18, 19, and these, in turn, are connected in series with inductance 20, resistor 21, inductance 22, resistor 23, voltage-multiplying circuit 24, diode 25, diode 26 and one side of capacitor 27. The other side of capacitor 27 is connected to voltage source 10.

Voltage-multiplying circuit 24 comprises a four-layer diode 28, capacitor 29 and diode 30 connected in series between diode 25 and resistor 23. Inductor 31 is connected between voltage source 10 and the junction of four-layer diode 28 and capacitor 29. Transistor 32 has its emitter connected to the junction of capacitor 29 and diode 30 while its base is connected to the junction of resistor 33 and the cathode of diode 30. The other side of resistor 33 is connected to ground. The collector of transistor 32 is connected to resistor 34 which, in turn, is connected to ground. This constitutes one segment 24' of the voltage-multiplying circuit. A similar segment 24'' as that of segment 24′ may be connected between segment 24′ and resistor 23, as illustrated, or as many of these segments as desired may be so connected in accordance with the voltage needed to provide sufficient advance voltage to the shift register.

A delay circuit 35 is connected in shunt with diode 26 and comprises a transistor 36 having its emitter connected to the positive terminal of diode 26 while the base is connected between the negative terminal of diode 26 and a resistor 37 which, in turn, is connected to ground. The collector of transistor 36 is serially connected to one side of prime winding "PRIME." The other side of the prime winding is connected in series with resistor 38 and inductance 39 which, in turn, is connected to ground. Delay and priming circuit 35 is fully disclosed in applicant's copending U.S. patent application, Ser. No. 378,652, now Patent No. 3,284,644 filed June 29, 1964, and assigned to the present assignee.

Operation of the circuit of FIGURE 1 is as follows: When the circuit is connected to source of voltage 10, capacitor 27 charges through transistor 36, prime resistance 38, and inductance 39. The base current of transistor 36 is supplied through resistor 37.

Simultaneously, when source is connected to 10, capacitor 29 charges through inductance 31, transistor 32, and resistance 34. The base current of transistor 32 is supplied through resistor 33. Four-layer diode 28 will isolate the charging circuits. This operation is typical for each segment of voltage-multiplying circuit 24.

Application of a positive voltage pulse to the TRIG "O" terminal will turn four-layer diode 11, which is $SW_I$, on. Capacitor 27 will start to discharge, turning on four-layer diodes 28 and 28′ causing capacitors 29 and 29′ to discharge in series, which provides voltage aiding. Discharge circuit is capacitor 27, $SW_I$, diode 13, ADV "O" winding, resistance 18, and inductance 20, resistance 21, inductance 22, resistance 23, diode 30′, capacitor 29′, four layer diode 28′, diode 30, capacitor 29, four layer diode 28, diode 25, diode 26, and back to capacitor 27.

Discharge current produces a voltage drop across diodes 26, 30 and 30′ which back-biases transistors 36, 32 and 32′ turning them to an off or nonconducting condition. Capacitor 27 will charge in a reverse manner to provide a reverse voltage, back-biasing $SW_I$.

Due to the fact that transistor 36 is in a nonconducting condition, capacitor 27 starts to recharge through resistor 37 and diode 26, which will continue until diode 26 can recover to its off condition.

Diode 26 is selected to have a long recovery time and resistor 37 has a large ohmic value which is large enough to prevent continuous conduction of four-layer diode 11. As soon as diode 26 recovers, i.e., turns off, back-bias is no longer applied to transistor 36 which now turns on to its conduction state and capacitor 27 now recharges through transistor 36, inductor 39, prime winding and resistor 38. The current rises in an L-C mode until the capacitor 27 charges to slightly higher than the voltage thereof, back-biasing transistor 36, thereby causing rapid turn-off. The fast recharge of capacitor 27 is allowable since transistor 36 has been held off long enough to permit $SW_I$ to recover to its nonconduction state. The same operation, as outlined above, occurs when a positive voltage pulse is applied to terminal TRIG "E" to operate $SW_{II}$. The current pulse may be varied in peak amplitude and duration by proper selection of inductor 39 and capacitor 27.

As has been discerned, there has been described a novel circuit arrangement to provide a high degree of proper sequence and fail-safe operation to a load device, such as, for example, a shift register.

While the present invention has been described in conjunction with four-layer diodes, it is to be understood that other solid state switching semi-conductors, such as, for example, of the silicon-controlled rectifier type, can be used in place of the four-layer diodes. Such an arrangement is illustrated in FIGURE 8 of the above-mentioned application wherein the four-layer diodes are replaced by SCR's.

Figure 2:
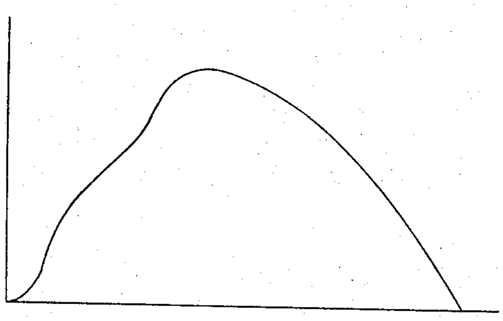
FIGURE 2 is a graphic representation of advance current without the proper amount of voltage.

FIGURE 2 shows the distortion of the advance pulse waveform when the source supply is too low for the register bit content. As the ratio of bit content to supply voltage goes up, the dip in the leading edge of the advance pulse becomes worse. When the waveshape distorts, the shift register operating range decreases.

Figure 3:
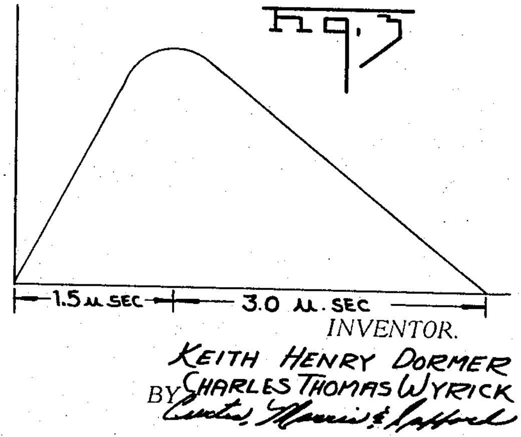
FIGURE 3 is a graphic representation of advance current with the proper amount of voltage.

FIGURE 3 shows the proper pulse shape for optimum shift register performance.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. An electronic circuit comprising a pair of solid state switch means connected to be alternatively driven to conduction, an input for applying a substantially constant voltage to said switch means, means in circuit with each switch means and responsive to conduction thereof to produce output pulses, means connected to said last-mentioned means to delay conduction of said switch means to provide control current and to provide proper sequential conduction thereof, and voltage-multiplying means in said output pulse producing means to provide increased voltage.

2. An electronic circuit according to claim 1 wherein said output pulse producing means includes capacitor means.

3. An electronic circuit according to claim 1 wherein said switch means are four-layer diodes.

4. An electronic circuit according to claim 1 wherein said delay means includes a transistor means and impedance means connected to a back-biasing means.

5. An electronic circuit according to claim 4 wherein said impedance means includes a relatively high resistance to provide back-biasing through said back-biasing means to said transistor means until recovery thereof and an inductance means to provide recovery of said switch means.

6. An electronic circuit according to claim 1 wherein said voltage-multiplying means includes a transistor means and impedance means connected to a back-biasing means.

7. A power supply for applying pulses of current to a plurality of load devices at high speed comprising pulse-forming network means in circuit with each load device, a substantially constant voltage source connected to said pulse-forming network means, means connected to said pulse-forming network means to control each pulse-forming network means to provide proper sequential pulses thereby to said load devices, means included in said control means to provide control current to another load device, and means in said control means to provide increased voltage to said plurality of load devices.

8. A pulse generator comprising a first and second solid state switching means, a source of substantially constant voltage connected to said switching means, triggering pulse source means connected to each switching means, capacitor means connected to be discharged by the conduction of each switching means, pulse-forming network means including said capacitor means connected to output terminal means, the charging and discharging of said capacitor means producing output pulses at said output terminal means, and means connected to said pulse-forming network means to delay conduction of said switching means, to provide control current, to provide proper sequential conduction thereof and to provide increased voltage at said output terminal means.

9. A pulse generator according to claim 8 wherein said solid state switching means comprises four-layer diode means.

10. A pulse generator according to claim 8 wherein said last-mentioned means includes transistor means connected to said capacitor means including impedance means and back-biasing means to provide conduction and nonconduction of said transistor means.

11. A power supply adapted to energize with short current pulses alternate ones of inductive windings of a magnetic core shift register and the like comprising a substantially constant voltage source, a first switch means adapted to be triggered on by a voltage, first means including a blocking diode and capacitor means for connecting said first switch means to one of the inductive windings in a pulse-forming circuit, a second switch means adapted to be triggered on by a voltage, second means including another blocking diode and said capacitor means for connecting said second switch means to another of said inductive windings in another pulse-forming circuit, means in said pulse-forming circuits for delaying recharging of said capacitor for conduction of said switch means to provide proper sequential operation thereof and to provide control current to a further of said inductive windings, and voltage-multiplying means in said pulse-forming circuits to provide increased voltage to said inductive windings.

12. A power supply according to claim 11 wherein said delay means includes a first circuit means providing high impedance to prevent any recharging of said capacitor means for a period of time and a second circuit means providing low impedance to recharge said capacitor means.

13. A power supply according to claim 12 wherein said first circuit means includes a semi-conductor means, resistance means and back-biasing means connected to said semi-conductor means, said second circuit means includes said semi-conductor means and inductance means connected thereto.

14. A power supply according to claim 11 wherein said switch means are four-layer diodes.

15. A power supply according to claim 11 wherein said voltage-multiplying means includes a first circuit means for providing high impedance to prevent any recharging of said capacitor means for a period of time and a second circuit means for providing low impedance to recharge said capacitor means.

16. A power supply according to claim 15 wherein said first circuit means includes a semi-conductor means, resistance means and back-biasing means connected to said semi-conductor means, and isolation means connected to said semi-conductor means; said second circuit means includes said semi-conductor means with impedance means and further isolation means connected thereto.

References Cited

UNITED STATES PATENTS 3,284,644 11/1966 Dormer et al. -------- 307—88

BERNARD KONICK, *Primary Examiner.*

P. SPERBER, *Assistant Examiner.*